US009647427B2

(12) United States Patent
Delchambre et al.

(10) Patent No.: US 9,647,427 B2
(45) Date of Patent: May 9, 2017

(54) SPARK-GAP OF AN ELECTRIC ARC GENERATION DEVICE, AND CORRESPONDING ELECTRIC ARC GENERATION DEVICE

(71) Applicant: ENE29 S.àr.L., Luxembourg (LU)

(72) Inventors: Michael Delchambre, Toulouse (FR);
Sergei Labuda, Pins-Justaret (FR);
Guillaume Onquiert, Cintegabelle (FR)

(73) Assignee: ENE29 S.àr.L., Luxembourg (LU)

( * ) Notice: Subject to any disclaimer, the term of this patent is extended or adjusted under 35 U.S.C. 154(b) by 0 days.

(21) Appl. No.: 15/023,340

(22) PCT Filed: Sep. 17, 2014

(86) PCT No.: PCT/IB2014/064595
§ 371 (c)(1),
(2) Date: May 12, 2016

(87) PCT Pub. No.: WO2015/040556
PCT Pub. Date: Mar. 26, 2015

(65) Prior Publication Data
US 2016/0268779 A1 Sep. 15, 2016

(30) Foreign Application Priority Data

Sep. 19, 2013 (FR) ...................................... 13 59031

(51) Int. Cl.
*H01T 1/22* (2006.01)
*E21B 43/25* (2006.01)
(Continued)

(52) U.S. Cl.
CPC .............. *H01T 1/22* (2013.01); *E21B 28/00* (2013.01); *E21B 43/003* (2013.01); *E21B 43/25* (2013.01); *G01V 1/157* (2013.01)

(58) Field of Classification Search
CPC ........ E21B 43/003; E21B 28/00; G01V 1/157
See application file for complete search history.

(56) References Cited

U.S. PATENT DOCUMENTS 2,559,227 A 7/1951 Rieber
3,225,578 A 12/1965 Krieger
(Continued)

FOREIGN PATENT DOCUMENTS

JP 2007265834 A 10/2007
JP 4352098 B1 10/2009
JP 2010165487 A * 7/2010

OTHER PUBLICATIONS

Translation of written opinion of international search authority Mar. 2015.*

*Primary Examiner* — Tracie Y Green
(74) *Attorney, Agent, or Firm* — Seed IP Law Group LLP

(57) ABSTRACT

A spark-gap of the invention comprises: a first body supporting a first electrode mounting connected to a first electrode having a first electrode end, a second body supporting a second electrode mounting connected to a second electrode placed so as to face the first electrode end, and a connection arm connecting the first body to the second body. The first body and the second body have a generally cylindrical outer shape and are aligned along a common longitudinal axis. The first electrode end is offset, relative to the longitudinal axis, toward the side opposite the connection arm. The invention also relates to an electric arc generation device comprising such a spark-gap.

9 Claims, 3 Drawing Sheets

(51) Int. Cl.
    *E21B 28/00*    (2006.01)
    *G01V 1/157*    (2006.01)
    *E21B 43/00*    (2006.01)

(56) References Cited

U.S. PATENT DOCUMENTS

| | | |
|---|---|---|
| 4,345,650 A | 8/1982 | Wesley |
| 4,628,399 A | 12/1986 | Shigemori et al. |
| 4,769,736 A | 9/1988 | Boy |
| 4,905,673 A | 3/1990 | Pimiskern |
| 4,997,044 A | 3/1991 | Stack |
| 5,301,169 A | 4/1994 | Baria et al. |
| 6,362,945 B1 | 3/2002 | Bobert et al. |
| 6,427,774 B2 | 8/2002 | Thomas et al. |
| 8,189,315 B2 | 5/2012 | Boy et al. |
| 8,785,803 B2 | 7/2014 | Garner |
| 9,198,825 B2 | 12/2015 | Katragadda et al. |
| 2002/0075125 A1 | 6/2002 | Yang |
| 2004/0068209 A1 | 4/2004 | Matula et al. |
| 2013/0345600 A1 | 12/2013 | Katragadda et al. |

\* cited by examiner

SPARK-GAP OF AN ELECTRIC ARC GENERATION DEVICE, AND CORRESPONDING ELECTRIC ARC GENERATION DEVICE

The invention relates to a spark-gap of an electric arc generation device, as well as to a corresponding electric arc generation device.

Such a device is intended for placement in a deep well (for example several kilometers deep). Generation of an electric arc is then for example used to create a seismic wave in the soil or to stimulate hydrocarbon production.

Document WO-90/13830 illustrates a prior art device in the field of the present invention. It discloses a source of seismic waves that is usable in a borehole filled with liquid. The device described in that document is intended to create seismic waves, for example in order to conduct a geological survey of the soil. The described source of seismic waves comprises a module supported by a cable and including means for generating a high voltage and for charging a capacitor bank. Then an acoustic wave is created by causing a rapid discharge of the capacitors across a pair of electrodes defining a discharge gap. The electrodes are immersed in a liquid, at the same pressure as the liquid in the borehole (at the electrodes), and are separated by a gap of a predetermined width.

FIGS. 3 and 4 of that prior art document show two different embodiments of a spark-gap. According to a first embodiment, a central electrode is arranged at an equal distance from three peripheral electrodes, defining a discharge gap with each of them. The second embodiment proposed therein comprises two similar electrodes placed facing one another while keeping a discharge gap between them.

In the field of stimulating oil production, U.S. Pat. No. 4,345,650 discloses an electrohydraulic device for generating a shock wave to create forced migration of oil toward a collection well. A spark is created between two electrodes to generate the shock wave. A reflector is provided therein to guide the shock wave.

In this same field of stimulating oil production, document WO-01/59252 describes a device comprising pulsed energy sources with, on the one hand, an electrohydraulic generator that produces an electromagnetic pulse and an acoustic pulse, and on the other hand, an electromagnetic generator that produces an electromagnetic pulse. The embodiment of FIG. 8 of that document illustrates a spark-gap with two electrodes arranged in a flexible sleeve filled with liquid. Each electrode is supported by an electrode mounting, and metal arms connect the two electrode mountings. These arms extend parallel to the electrodes, at a distance from them.

In a structure as illustrated in FIG. 8 of WO-01/59252, during an electrical discharge between the electrodes, it is necessary to prevent a discharge from occurring between an electrode and a metal arm. This discharge would be uncontrolled and the energy it dissipates is regarded as lost.

When reducing the size of the spark-gap is desired, the metal arms that can be used for example to provide a current return path, or a reflector, are moved closer to the electrodes and the risk of leakage is increased.

Another technical problem encountered with spark-gaps of the prior art is electrode wear. With each electrical discharge, electrons are stripped from one of the electrodes and wear occurs at the tip of the electrodes. The distance between the two electrodes increases as the spark-gap is used over time, thereby reducing device performance.

Document WO-90/13830 proposes the use of a refractory material such as tungsten to create the ends of the electrodes. Document WO-0159252 then proposes having a consumable "pencil" style electrode with a consumable central electrode of adjustable length (FIG. 10) or with a filament (11). Another solution proposed by the latter document (FIG. 12) is to pass gas over an electrode, the gas being ionized by the potential difference between the electrodes and thus protecting the electrodes.

The present invention aims to provide a spark-gap in which electrodes are arranged between metal arms, but for which the risk of an electric arc developing between an electrode and an arm is substantially reduced in comparison to devices of the prior art.

Advantageously, the present invention provides a spark-gap of this type that is reduced in size compared to known spark-gaps of the prior art.

A spark-gap according to the present invention also will preferably have a longer life due to controlled wear of the electrodes.

To this end, the invention provides a spark-gap of an electric arc generation device, comprising:
  a first body supporting a first electrode mounting connected to a first electrode having a first electrode end,
  a second body supporting a second electrode mounting connected to a second electrode placed so as to face the first electrode end, and
  a connection arm connecting the first body to the second body,
  the first body and the second body having a generally cylindrical outer shape and being aligned along a common longitudinal axis.

According to the invention, the first electrode end is offset, relative to the longitudinal axis, toward the side opposite the connection arm.

In this manner, in comparison to a prior art device, the electrodes are further away from the connection arm, thereby substantially reducing the risk of the electric arc deviating toward the connection arm.

In a spark-gap according to the invention, to further limit the risk of deviation of the electric arc, it is advantageously provided that the spark-gap has only one connection arm.

A first embodiment of the invention provides that the first electrode is in the form of a rod bearing, at its end, the first electrode end which has its axis inclined relative to the longitudinal axis.

In this first embodiment and/or in an alternative embodiment, the second electrode may have a base provided with means for attaching the second electrode to the second mounting, and a second electrode end opposite the base of the second electrode and arranged facing the first electrode end; the base of the second electrode may be substantially aligned with the longitudinal axis, and the second electrode has for example a discontinuity in alignment such that the second electrode end is offset, relative to the longitudinal axis, toward the side opposite the connection arm.

To minimize wear of the second electrode, the latter advantageously has a concave surface facing the first electrode end.

To allow changing the second electrode, it has, for example, a base provided with means for attaching the second electrode to the second mounting, and a second electrode end opposite the base of the second electrode and facing the first electrode end, the second electrode end preferably being a separate part attached to the second electrode by means of at least one pin.

In a spark-gap according to the invention, there may advantageously be provided a membrane at least partially surrounding the first electrode, second electrode, and connection arm, so as to create a sealed chamber around a space comprised between the first electrode and the second electrode. It is thus easier to control an electric arc generated between the electrodes. In this embodiment, the chamber defined in particular by the membrane contains for example a fluid which is preferably a dielectric liquid.

The invention also relates to an electric arc generation device, characterized in that it comprises a spark-gap as presented above, and in that the second electrode is connected to the ground of said device.

Details and advantages of the invention will be more apparent from the following description, provided with reference to the accompanying drawings in which.

Figure 1:
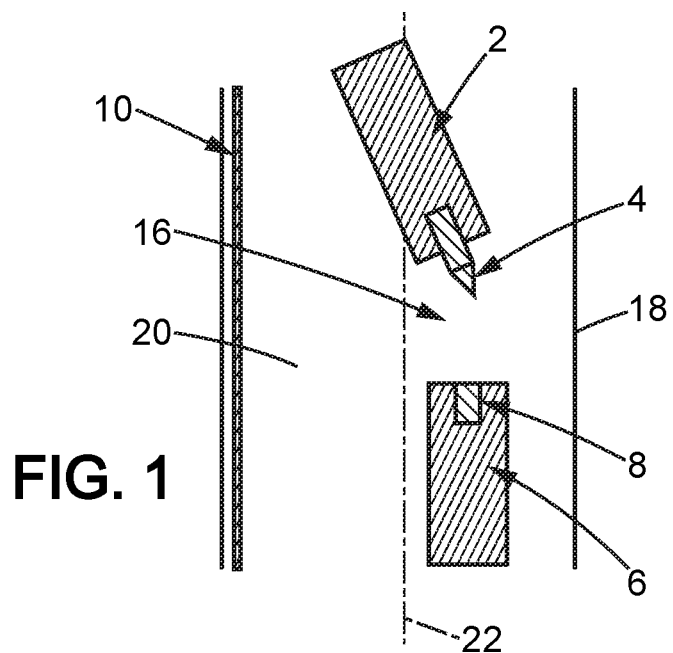
FIG. 1 is a general elevation view of a spark-gap according to the invention.
Figure 2:
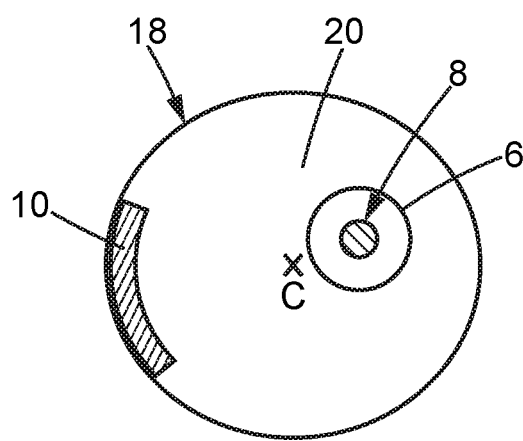
FIG. 2 is a schematic top view corresponding to FIG. 1.

FIGS. 1 and 2 show highly schematic illustrations of the principle of the invention. In these figures, a spark-gap is represented that comprises a first electrode 2 having a first electrode end 4, a second electrode 6 having a second electrode end 8, and a connection arm 10 connecting an upper body 11 supporting the first electrode 2 by means of a first electrode mounting 12 of insulating material to a lower body 13 supporting the second electrode 4 by means of a second electrode mounting 14 (see FIG. 3). The upper body 11 and lower body 13 each provide a circular cylindrical sleeve and are aligned along the same longitudinal axis 22. The upper body 11, lower body 13, and connection arm 10 may form a single part.

The first electrode 2 is a known type of electrode. Electrodes disclosed in the prior art documents cited in the preamble of the present document (WO-90/13830 and WO-01/59252 for example) can be used here. For example, the electrode may be in the form of a circular cylindrical rod. In the preferred embodiment illustrated here, the first electrode 2 and the second electrode 6 each have an electrode end formed by a separate part. The first mounting 12 insulates the first electrode 2 from the upper body 11 and mechanically supports the first electrode 2. An electronic device of known type, generally comprising a series of capacitors, is used to bring the first electrode 2 as well as the first electrode end 4 to a very high electric potential in a very short time while a high intensity current is passing through it.

The second electrode 6, respectively the second electrode end 8, is arranged facing the first electrode 2, respectively the first electrode end 4. The current entering through the first electrode 2 must travel through the second electrode 6 while limiting current leakage as much as possible, said leakage able to occur primarily via the connection arm 10, for example such that a discharge region 16 is formed that is entirely comprised between the first electrode 2 and the second electrode 6, and more precisely between the first electrode end 4 and the second electrode end 8.

For this purpose, the invention proposes moving the electrode ends, which the electric arc forms between, away from the connection arm 10.

A spark-gap, and more generally an electric arc generation device, has a generally cylindrical outer shape corresponding to the shape of the sleeve of the upper body 11 and lower body 13. Such a device is in fact intended to be introduced into a circular borehole and therefore has a shape adapted to the hole into which it is introduced. The spark-gap and the corresponding electric arc generation device thus have a central longitudinal axis corresponding to longitudinal axis 22. The electrodes of the spark-gap are conventionally (in the state of the art prior to the invention) aligned along this central longitudinal axis.

As illustrated in the figures, the electrodes are generally confined in a chamber filled with a fluid, gas or liquid, preferably dielectric, whose composition is managed to provide better control of the electric arc generated between the electrodes. A flexible membrane 18 is thus placed around the electrodes and the connection arm(s) 10, between the first mounting 12 and second mounting 14, so as to form a sealed chamber 20 in which is enclosed for example a predetermined amount of dielectric liquid. When a wave is generated by a discharge between the electrodes, the wave propagates in the fluid inside the chamber and is transmitted by the flexible membrane 18 to the external fluid (oil, mud, water, or other) in which the device is immersed.

The flexible membrane 18, at rest, has a tubular cylindrical shape having a longitudinal axis corresponding to the longitudinal axis 22 of the spark-gap and of the corresponding electric arc generation device.

In comparison to the shape of the prior art described above, in which the electrodes of the spark-gap are aligned substantially along the longitudinal axis of the spark-gap and thus also of the flexible membrane, the invention proposes offsetting the electrodes and moving them as far as possible from the connection arm 10 described above. In FIG. 2, one will thus note for example that the second electrode 6 and its second end are off-center relative to the center C of the chamber 20, away from the connection arm 10. It is then preferable to have only one connection arm 10. However, the invention may also be implemented with an embodiment having a plurality of connection arms. Preferably, the connection arms are on the same side of the spark-gap. The electrodes are then offset, relative to the longitudinal axis, toward the side opposite the connection arms. If two connection arms are diametrically opposed, it is also possible to distance the electrodes from the connection arms by offsetting them in a plane of symmetry of the two connection arms.

Figure 3:
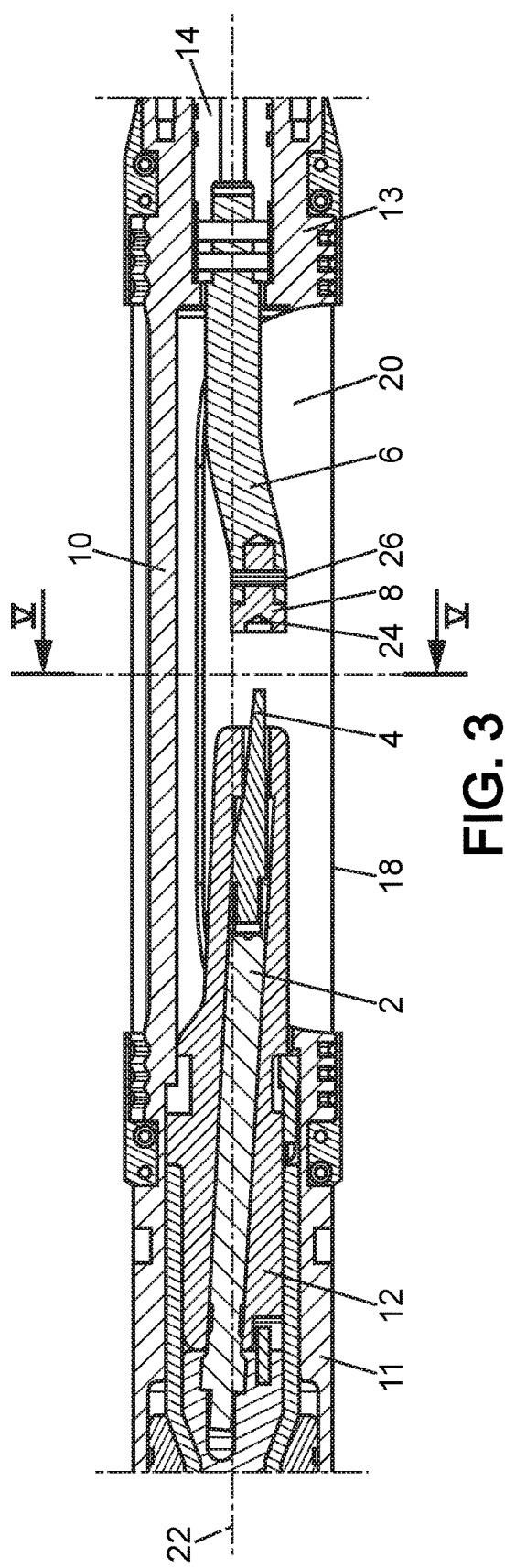
FIG. 3 is a longitudinal sectional view of a spark-gap according to a preferred embodiment of the invention.
Figure 4:
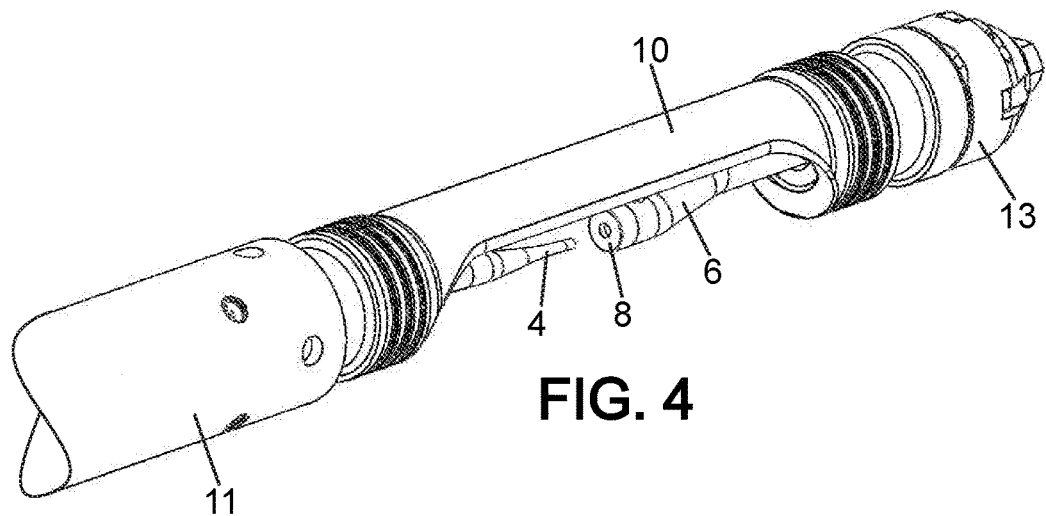
FIG. 4 is a schematic perspective view of a spark-gap in which some elements have been omitted for clarity.

FIG. 3 illustrates a preferred embodiment of the invention, in a longitudinal sectional view. The references used in FIGS. 1 and 2 are used again here to designate similar parts. To better illustrate this embodiment, FIG. 4 shows the device of FIG. 3 in perspective, but without showing the membrane 18 or the first mounting 12.

We find in FIG. 3 the structure described above with reference to FIGS. 1 and 2, but with further details.

In this FIG. 3, the longitudinal axis 22 is represented which corresponds to the longitudinal axis of the upper body 11, lower body 13, and flexible membrane 18 (at rest).

The first electrode 2 is in the form of a circular cylindrical rod and is extended by its first electrode end 4. This assembly is inclined relative to the longitudinal axis 22. The inclination of this assembly is such that the distal end of the first electrode end 4 is farther from the connection arm 10 than the longitudinal axis 22 (parallel to the connection arm 10).

Figure 5:
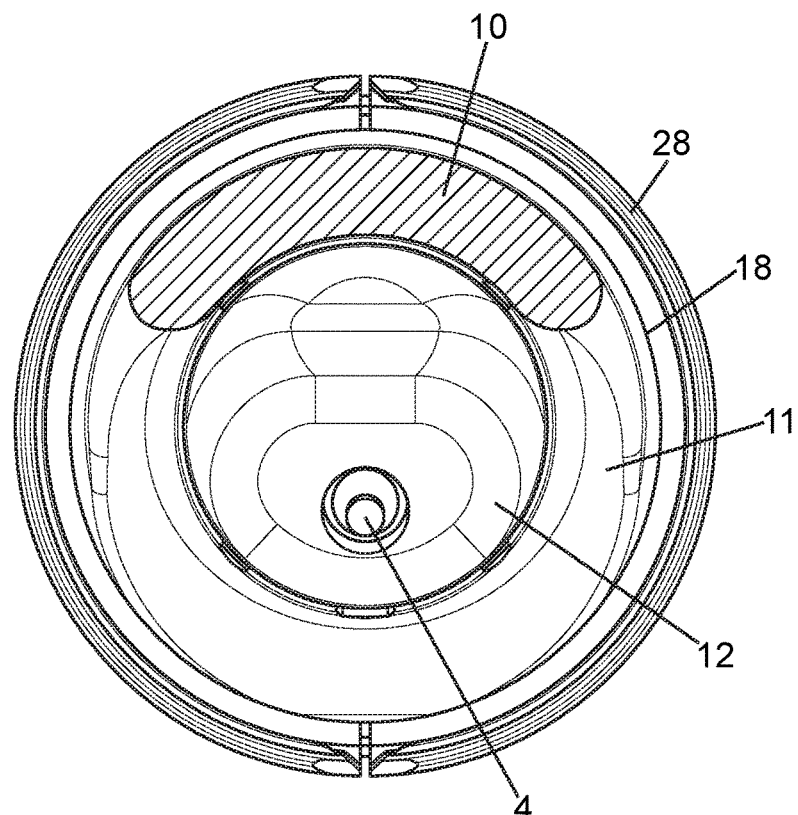
FIG. 5 is an enlarged sectional view along section line V-V of FIG. 3.

FIG. 5 illustrates the inclination of the first electrode, more specifically of the first electrode end 4. One will note in this figure how the electrode end is distanced from the connection arm 10. This figure further shows a shell 28 which surrounds the upper body 11 and which can be used to support the membrane 18 at one of its ends. A similar shell may, of course, also be provided around the lower body 13.

The second electrode end 8 is also offset relative to the longitudinal axis 22 so as to be further away from the connection arm 10 than the longitudinal axis 22. The second electrode end 8 and the first electrode end 4 are arranged such that the shortest distance between these two ends is substantially parallel to the longitudinal axis 22.

The second electrode end 8 preferably has a concave surface 24, for example cup-shaped, facing the distal end 4 of the first electrode end. The second electrode 6, and therefore also the second electrode end 8 associated therewith, is adapted to be connected to ground. Therefore, when an electric arc is created between the two electrodes, it is at this second end 8 that electrode wear is observed. The presence of the concave surface 24 serves to limit such wear in comparison to a pointed electrode. The wear to the second electrode is distributed over the entire concave surface 24. Therefore, there is little variation in the distance between the two electrode ends, and the characteristics of the electric arc generated between the electrodes do not degrade.

It is also provided to allow changing the second electrode end 8. In the embodiment illustrated, one will note that this second electrode end 8 is mounted on the electrode 6 by means of a pin 26.

To offset the second electrode end 8 relative to the longitudinal axis 22, it is proposed here to use a curving second electrode 6. Thus this second electrode 6 has a base, or proximal end, for attaching the second electrode 6 to the second mounting 14, and a central portion with an S-shaped discontinuity in alignment bearing a distal end configured to receive the second electrode end 8.

A spark-gap as described above is intended to be coupled to a high voltage and high current generator, the second electrode 6 being connected to the ground of such a generator. An electric arc is generated when the voltage at the first electrode 2 exceeds a given threshold, called the discharge threshold. The value of the discharge threshold depends in particular on the distance separating the two electrodes, on the nature of the dielectric fluid that is within the chamber 20, and possibly on the prevailing pressure in this chamber.

The embodiment of the invention described above allows preventing the generation of an arc between the first electrode, intended to be connected to a high voltage source, and the metal connection arm(s) used as a support to maintain the structure of the spark-gap. Indeed, distancing the electrodes from this (these) connection arm(s) greatly reduces, and may even eliminate, the risk of generating an electric arc between the first electrode and the metal arm.

In the embodiment described above, the second electrode 6 preferably has a greater surface area facing the first electrode 2 than in comparable devices of the prior art. It is thus possible to have the consumption of material at the second electrode, which is grounded, occur over the entire concave surface 24. As the wear is thus distributed over a larger surface area, the distance between the first electrode 2 and the second electrode 6 decreases less rapidly than in known embodiments of the prior art. Optimal spacing is thus maintained between the two electrodes of the spark-gap for a much longer period.

Preferably, the concave surface 24 has at least one sharp edge which facilitates initiating the generation of an electric arc. This feature further discourages an arc from deviating toward the connection arm(s). As illustrated in FIG. 3, one may for example provide an edge around the concave surface 24 provided on the second electrode end 8.

The invention thus provides means of limiting the risk of arc leakage to a connection arm. This makes it possible to reduce the size of a spark-gap having such a structure, meaning with connection arms.

In the preferred embodiment, one will note that one electrode is inclined and the other is curved so as to distance the electrode ends, and therefore the electric arc to be generated between them, from a metal connection arm. There may be two inclined electrodes or two curved electrodes. It is also conceivable to distance the electrodes by other means, for example by offsetting them.

The invention is not limited to the preferred embodiment described above by way of non-limiting example and represented in the drawings, nor to the mentioned variants, but concerns any embodiment within the reach of the skilled person that lies within the scope of the following claims.

The invention claimed is:

1. A spark-gap of an electric arc generation device, comprising:
    a first body supporting a first electrode mounting connected to a first electrode having a first electrode end,
    a second body supporting a second electrode mounting connected to a second electrode placed so as to face the first electrode end, and
    a connection arm connecting the first body to the second body,
    the first body and the second body having a generally cylindrical outer shape and being aligned along a common longitudinal axis,
    wherein the first electrode end is offset, relative to the longitudinal axis, toward a side opposite the connection arm.

2. The spark-gap according to claim 1, wherein the spark-gap has only one connection arm.

3. The spark-gap according to claim 1, wherein the first electrode is formed as a rod bearing, and the first electrode end has an axis inclined relative to the longitudinal axis.

4. The spark-gap according to claim 1, wherein the second electrode has a base for attaching the second electrode to the second electrode mounting, and a second electrode end opposite the base of the second electrode and arranged facing the first electrode end; wherein the base of the second electrode is substantially aligned with the longitudinal axis, and wherein the second electrode has a discontinuity in alignment such that the second electrode end is offset, relative to the longitudinal axis, toward the side opposite the connection arm.

5. The spark-gap according to claim 1, wherein the second electrode has a concave surface facing the first electrode end.

6. The spark-gap according to claim 1, wherein the second electrode has a base for attaching the second electrode to the second mounting, and a second electrode end opposite the base of the second electrode and facing the first electrode end, and wherein the second electrode end is a separate part attached to the second electrode by at least one pin.

7. The spark-gap according to claim 1, further comprising a membrane at least partially surrounding the first electrode, second electrode, and connection arm, so as to create a sealed chamber around a space comprised between the first electrode and the second electrode.

8. The spark-gap according to claim 7, wherein the chamber defined in particular by the membrane contains a dielectric fluid.

9. An electric arc generation device, comprising a spark-gap according to claim 1, and wherein the second electrode is connected to a ground of said device.

* * * * *